United States Patent
Mercier, Sr.

(10) Patent No.: US 10,690,356 B2
(45) Date of Patent: Jun. 23, 2020

(54) ENHANCED CONVECTION, DIFFERENTIAL TEMPERATURE MANAGED, HYDRONIC HEATING APPLIANCE

(71) Applicant: Paul D Mercier, Sr., Antrim, NH (US)

(72) Inventor: Paul D Mercier, Sr., Antrim, NH (US)

( * ) Notice: Subject to any disclaimer, the term of this patent is extended or adjusted under 35 U.S.C. 154(b) by 224 days.

(21) Appl. No.: 15/486,389

(22) Filed: Apr. 13, 2017

(65) Prior Publication Data

US 2017/0299200 A1    Oct. 19, 2017

Related U.S. Application Data

(60) Provisional application No. 62/321,846, filed on Apr. 13, 2016.

(51) Int. Cl.
*F24D 19/10* (2006.01)
*F24D 3/02* (2006.01)
*F24D 3/10* (2006.01)

(52) U.S. Cl.
CPC ........... *F24D 19/1012* (2013.01); *F24D 3/02* (2013.01); *F24D 3/1008* (2013.01);
(Continued)

(58) Field of Classification Search
CPC ............. F24D 19/1012; F24D 19/1015; F24D 3/1008; F24D 3/1075; F24D 3/02;
(Continued)

(56) References Cited

U.S. PATENT DOCUMENTS 1,824,574 A  *  9/1931  Schunemann ............ F24D 3/02
                                                    122/406.1
4,456,456 A  *  6/1984  Pompei .............. B01D 19/0068
                                                    237/63

(Continued)

FOREIGN PATENT DOCUMENTS

JP  2013178036 A  *  9/2013  ......... H05K 7/20272

OTHER PUBLICATIONS

"Handbook of HVAC Design", Grimm, Nils R. et al., McGraw-Hill Publishing Co., Chapter 6, 1990. (Year: 1990).*
Our Unpowered Forced Hot Water (FHW) Gravity Heating System, BoilersOnDemand.com, Posted on Dec. 13, 2011, 12:00am (http://www.boilersondemand.com/heating/our-unpowered-forced-hot-water-fhw-gravity-heating-system/?share=email&nb=1 ).
Mercier, Paul D. Sr., Beyond AFUE toward hydronic heating system efficiency, Plumbing Engineer, May 2016, pp. 62-65.

*Primary Examiner* — Steven B McAllister
*Assistant Examiner* — Daniel E. Namay
(74) *Attorney, Agent, or Firm* — Maine Cernota & Rardin

(57) ABSTRACT

A system, apparatus, and method for a differential temperature managed integral, free standing, hydronic heating appliance uses a high-mass heat source coupled to a single, highly-efficient, variable speed, Electronically Commutated Motor (ECM)-driven Delta-T stand-alone system circulator which feeds one or more zone valves governing flow to one or more hydronic zones. Components are integrated into simplified, compact, assemblies. Zone valve packaging of a compact header improves hydronic performance (head pressure reduction and increased flow), complementing zone valve performance and reducing zone valve wiring labor and material content. Returns have full port valves and the boiler includes isolation valves. All manually activated valves are full port. This can include full port boiler isolation valves, circulator isolation valves and return valves. Paralleled, ganged, alignment of state-indicating-lamped zone valves provides rapid, functional indication of component and system performance while the need for a zone valve panel commonly found on hydronic heating systems is negated.

14 Claims, 15 Drawing Sheets

(52) U.S. Cl.
CPC ....... *F24D 3/1075* (2013.01); *F24D 19/1015* (2013.01); *F24D 2220/042* (2013.01); *F24D 2220/044* (2013.01); *Y02B 30/745* (2013.01)

(58) Field of Classification Search
CPC ......... F24D 2220/042; F24D 2220/044; F24D 2220/0228; F24D 2220/0285; F24D 2220/0292; F24D 2220/0207; F24D 11/004; F16L 55/07; F16L 3/221; F16L 3/222
USPC ...................................... 237/8 A; 137/561 A
See application file for complete search history.

(56) References Cited

U.S. PATENT DOCUMENTS

| | | | | |
|---|---|---|---|---|
| 4,750,472 A * | 6/1988 | Fazekas | ............. | F24D 19/1051 122/13.3 |
| 5,109,806 A * | 5/1992 | Duggan | ................... | F24H 1/32 122/135.2 |
| 5,203,689 A * | 4/1993 | Duggan | ................. | F23D 14/74 122/17.1 |
| 5,381,902 A * | 1/1995 | Dumser | ................ | F24D 3/1066 137/377 |
| 5,390,660 A * | 2/1995 | Danielson | ............. | F24D 3/1058 126/271.2 R |
| 5,617,994 A * | 4/1997 | Fiedrich | .................... | F24D 3/02 237/8 R |
| 5,695,118 A * | 12/1997 | Rosenberg | ............ | F24D 3/1066 237/8 R |
| 5,950,575 A | 9/1999 | Simons et al. | | |
| 6,053,416 A * | 4/2000 | Specht | ................ | F24D 19/1015 236/1 B |
| 6,202,935 B1 * | 3/2001 | Akkala | .................. | F23D 14/72 165/57 |
| 6,237,855 B1 * | 5/2001 | Stickney | ............. | F24D 19/1009 237/8 A |
| 6,347,748 B1 * | 2/2002 | Lyons | .................. | F24D 3/1066 237/69 |
| 7,284,709 B2 * | 10/2007 | Guyer | ....................... | F24D 5/02 237/12.1 |
| 7,819,334 B2 * | 10/2010 | Pouchak | .................. | F23N 5/00 122/448.1 |
| 7,823,544 B2 * | 11/2010 | Christie | .................... | F22B 9/10 122/18.1 |
| 8,251,297 B2 * | 8/2012 | Pouchak | .................. | F23N 5/00 122/448.1 |
| 8,271,143 B2 * | 9/2012 | Deivasigamani | ... | F24D 17/0026 122/1 C |
| 8,326,134 B2 * | 12/2012 | Harper | ................. | F24D 11/004 392/312 |
| 8,342,419 B2 * | 1/2013 | Simensen | ............... | F24D 19/00 122/510 |
| 8,965,584 B2 * | 2/2015 | Deivasigamani | ... | F24D 17/0026 122/1 C |
| 9,618,232 B2 * | 4/2017 | Brown | ....................... | F24H 1/32 |
| 2005/0109482 A1 * | 5/2005 | Fabricius | ............... | F24D 3/1066 165/11.1 |
| 2005/0161521 A1 * | 7/2005 | Guyer | ...................... | F24D 5/02 237/12.1 |
| 2006/0230772 A1 * | 10/2006 | Wacknov | ................ | F24D 17/00 62/199 |
| 2007/0044574 A1 * | 3/2007 | Kawamoto | ............... | E03B 7/09 73/861.74 |
| 2008/0111376 A1 * | 5/2008 | Ferrero | ................. | F16L 41/021 285/376 |
| 2008/0156281 A1 * | 7/2008 | Kim | ...................... | F24D 3/1066 122/14.3 |
| 2008/0302882 A1 * | 12/2008 | Rosselli | ................. | A01G 25/00 239/1 |
| 2009/0173292 A1 * | 7/2009 | Christie | .................... | F22B 9/10 122/367.1 |
| 2009/0178717 A1 * | 7/2009 | Mirchildon | ............. | F24D 3/105 137/80 |
| 2010/0089339 A1 * | 4/2010 | Krause | ................ | F24D 17/0078 122/19.1 |
| 2010/0193595 A1 * | 8/2010 | Gwak | ................ | F24D 19/1015 237/56 |
| 2011/0000973 A1 * | 1/2011 | Do | ...................... | F24D 19/1015 237/8 A |
| 2011/0019980 A1 * | 1/2011 | Harper | .................. | F24D 11/004 392/312 |
| 2011/0290328 A1 * | 12/2011 | Jonsson | ................. | F24D 3/1066 137/1 |
| 2012/0043389 A1 * | 2/2012 | Yang | ..................... | F24D 3/1066 237/59 |
| 2012/0048381 A1 * | 3/2012 | MacDuff | ............... | F24D 3/1066 137/1 |
| 2012/0061483 A1 * | 3/2012 | Lee | ........................... | E03B 1/04 237/8 A |
| 2012/0090826 A1 * | 4/2012 | Cimberio | ............... | F16K 5/0605 165/200 |
| 2013/0199772 A1 * | 8/2013 | Fischer | .................... | F28F 27/00 165/287 |
| 2013/0274948 A1 * | 10/2013 | Matsuo | ................... | G06F 1/206 700/300 |
| 2014/0284391 A1 * | 9/2014 | Schmidlin | ................. | F24D 3/14 236/1 C |
| 2014/0305385 A1 * | 10/2014 | Brown | ...................... | F24H 1/32 122/18.31 |
| 2014/0360714 A1 * | 12/2014 | Matsuo | ............... | H05K 7/20272 165/284 |
| 2015/0122902 A1 * | 5/2015 | Sorensen | ............... | F24D 3/1075 237/8 C |
| 2015/0204580 A1 * | 7/2015 | Evans | .................. | F24H 9/2007 122/14.1 |
| 2016/0273782 A1 * | 9/2016 | Sorensen | ............... | F24D 3/1075 |
| 2017/0030593 A1 * | 2/2017 | O'Connor | ................ | F24D 3/02 |
| 2017/0102152 A1 * | 4/2017 | MacDuff | ............... | F24D 3/1066 |

* cited by examiner

HYDRONIC HEATING SYSTEM ELEMENTS

HYDRONIC BOILER AND DISTRIBUTION CONFIGURATION
ENHANCED CONVECTION ΔT HEATING APPLIANCE

APPLICATION:
1. ZONE VALVE (TACO) CLOSE CLUSTER
2. RETURN ZONE VALVING
3. VOLUME PRODUCT TO PLB/HTG MARKETS

CONSTRUCTION:
1. WELDMENT ON C/L AS SHOWN.
2. 100 PSI LEAK TEST.
3. FULL FLOW PIPING MANIFOLD.
4. BLACK CORR. RESISTANT FINISH.
5. BRANDING TO SUIT.
MANIFOLD, BOILER HEADER
1 1/4" X 3/4" X 3" TAP (MALE)

L334-4

"THE HANDY HEADER"

A COMPACT STEEL HYDRONIC HEADER
AVAILABLE WITH 2, 3, 4 OR 5 PORTS

COMPACT HYDRONIC HEADER ZONE VALVE ASSEMBLY
AVAILABLE WITH 2, 3, 4 OR 5 PORTS

COMPACT HYDRONIC HEADER BALL VALVE ASSEMBLY
AVAILABLE WITH 2, 3, 4 OR 5 PORTS

TWO-PASS BOILER HEAT EXCHANGER
FLUE PATHS & DHW IMMERSION COIL

THREE-PASS BOILER HEAT EXCHANGER
FLUE PATH

INDIRECT WATER HEATER (IWH)
(TYPICAL)

ZONE VALVE WIRING HARNESS
2 TO 5 VALVE TERMINATIONS (VARIABLE)

BOILER MODULE WIRING ASSEMBLY
115&24VAC POWER DISTRIBUTION AND END SWITCH

ΔT HYDRONIC HEATING APPLIANCE OVERVIEW
W/ ENHANCED CONVECTION

SYSTEM OVERVIEW DIAGRAM

FLOW CHART

MANIFOLD FIELD CONFIGURATION EXAMPLES 1 1/4 X 3/4 SYSTEMS

COMPACT APPLIANCE WITH PROPORTIONAL DIMENSIONS

ENHANCED CONVECTION, DIFFERENTIAL TEMPERATURE MANAGED, HYDRONIC HEATING APPLIANCE

RELATED APPLICATIONS

This application claims the benefit of U.S. Provisional Application No. 62/321,846, filed Apr. 13, 2016. This application is herein incorporated by reference in its entirety for all purposes.

FIELD OF THE INVENTION

The invention relates to a system, method, and device for hydronic heating, more specifically, a more compact, efficient, differential temperature managed hydronic heating appliance system and its operation.

BACKGROUND OF THE INVENTION

FIG. 1 depicts the four basic elements of hydronic forced hot water heating systems 100. A heated water generator comprising a hydronic boiler appropriately sized and fueled for the application. Hydronic Radiation for converting heated water into convective and/or radiated atmospheric warmth, suitable to the application. Hydronic Distribution comprising a configuration of pumps (circulators), valves, piping, and hydronic accessories to appropriately deliver heated water from the boiler to radiation. A control system for hydronic energy creation and distribution, typically comprising a boiler aquastat and thermostatic radiation control.

Hydronic Heating System Configuration and Installation

Current practice is to determine the total heat loss of an application, desired fuel source, domestic hot water (DHW) generation (if desired), and the radiation pattern. An appropriate boiler selection is made to complement the total radiation and domestic hot water (DHW) (if included). Distribution component selection follows to appropriately interface the boiler to radiation. The hydronic heating system components are subsequently aggregated at the site and assembled piece-by-piece along with interconnection materials. The method is skill, labor and material intensive, producing less than ideal hydronic energy performance in both combustion fuel and electrical power consumption. The contemporary consequence is that similarly specified hydronic heating systems vary dramatically in content and performance. The contributing factors are Hydronic Formulae as applied to "Fixed Speed" (or "Set Point") circulators are inherently compromised, having only incremental product selections to apply to finite applications. The predominant method of using multiple zone circulators typically exceeds the system delivery capacity under aggregate demand conditions, further reducing hydronic distribution efficiency. Alternately, using a circulator serving multiple zone valves affects individual zone satisfaction both under individual and aggregate demand conditions. An inherently inefficient cost reduction practice. Individual installation practitioner practice is the major system performance inhibitor. There is wide latitude of installation practices evidenced by contemporary trade publications and field observations. Hydronic distribution is the element of a total system installation allowing "personal expression" and hence technical abuse, informatively or not.

Hydronic Heating Medium (Hot Water) Attributes

The density of heated water changes with temperature and must be considered in flow calculations. Subsequent expansion of heated water must be compensated in a system to avoid excessive pressure. Ideal pressure in a typical hydronic system is accepted to be approximately One Atmosphere (15PSI). (The same applies to an automotive cooling system, by example.) Pressurization prevents aeration under circulation and overcomes system physical attributes that create hydronic noise and flow disruption. Air elimination is paramount to maintain flow integrity in any hydronic system, typically by mechanical venting on primary system manifolds and at distribution high points, as necessary. Hydronic convection is the natural attribute of heated water to rise and thus convect (flow) in a closed loop. Its negative effect of continuous heating in a hydronic system must be controlled by "flow check" valves that inhibit its effect during unpowered circulation. They necessarily create resistance and contribute to circulation energy consumption. Convection is neither considered nor applied via contemporary hydronic formulae, nor can it be calculated in system applications given the characteristics of contemporary installation practices.

Hydronic Heating Distribution Technology

Natural hydronic convection has been the basis and development of distributed heating from the Roman Age to the adoption of electric pumps (circulators) by the industry a century ago. They were generally referred to as "Gravity Heating Systems". Powered centrifugal circulation rapidly overcame the prior by allowing dramatic distribution flexibility at a reasonable cost. Hydronic heating distribution utilizing fixed-speed (or "set-point") circulators have become the industry norm. The recent development and introduction of both ECM (Electronically Commutated Motor) and Delta-T (Differential Temperature) Controlling Circulators are transforming hydronic heating distribution technology. Both ECM Circulators feature high starting torques and dramatically reduced energy consumption. Their operational life expectancies are significantly increased, reducing "torque stall" as the primary fail mode. The Delta-T Circulator is also "intelligent", as follows: Two externally positioned temperature sensors measure and display the supply and return loop temperatures. A temperature maintenance differential may be set (typically from 5 to 50° F.), and will be maintained by the circulator's infinitely variable speed capability. This translates into a gallons-per-minute hydronic delivery rate. As a reference, it is accepted that approximate 20° F. differential temperature maintenance in common radiation zones provides ideal heat transfer performance. It equates to an approximate 3 to 4 GPM delivery rate, depending upon attributes. Actual wattage use is dynamically calculated and displayed. The Delta-T circulator has five selectable operating modes.

These existing forced hot water heating systems use multiple pumps, valves, and controllers to supply heat. Complexity, reliability, efficiency, and cost issues result in non-optimum performance.

What is needed is an improved heating system that reduces complexity, and increases reliability and efficiency while reducing cost.

SUMMARY OF THE INVENTION

An embodiment provides an enhanced convection, differential temperature (Delta-T) managed, integrated free-standing hydronic heating appliance device comprising a high-mass heat source coupled to a single, variable speed, stand-alone system circulator; feeding at least one zone valve governing flow to at least one hydronic zone; wherein components are integrated into simplified, compact, assemblies; whereby head pressure is reduced and flow increased. Embodiments comprise a three-pass boiler configuration. Other embodiments comprise near-boiler piping packaging to zone valving for hydronic distribution efficiency, including convective fail-safe operation. Subsequent embodiments comprise a Taco Delta-T circulator. For additional embodiments the high-mass Delta-T combination lowers system operating temperature, further reducing "stand-by" losses and increasing thermal efficiency. Another embodiment comprises a high-mass cast-iron boiler, steel pipe, and malleable fittings. A following embodiment comprises at least one electronically controlled full port ball valve. Subsequent embodiments comprise a compact hydronic header. In additional embodiments the header comprises 2¾ inch center-to-center stub spacing for compact placement of zone valves. In included embodiments the header comprises zone valve close grouping on said header, enhancing status lamp visibility, and negating the use of a Zone Valve Control (ZVC). Yet further embodiments comprise at least one high pass volute circulator. Related embodiments comprise a Hydrolevel 3250-Plus aquastat. For further embodiments the device includes no internal flow check valves. Ensuing embodiments comprise an air eliminator and expansion tank.

Another embodiment provides an enhanced convection, differential temperature (Delta-T) managed, integrated free-standing hydronic heating system comprising a boiler module; a supply module; a return module; and a wiring harness; wherein components are integrated into simplified, compact, assemblies; whereby head pressure is reduced and flow increased. For yet further embodiments, the boiler module comprises a high mass cast iron boiler with capacity increments. For more embodiments, the supply module comprises an air eliminator; a compact steel hydronic header; and at least one zone valve. Continued embodiments comprise return zone isolation valving. For additional embodiments, the wiring harness comprises a pre-assembled 4-wire sub-assembly for each zone.

A yet further embodiment provides an enhanced convection, differential temperature (Delta-T) managed, integrated free-standing hydronic heating system comprising providing an integrated free-standing hydronic heating appliance, said appliance comprising a boiler module comprising a high mass cast iron boiler with capacity increments; a supply module comprising an air eliminator; a compact steel hydronic header; and at least one zone valve; a return module comprising return zone isolation valving; and a wiring harness comprising a pre-assembled 4-wire sub-assembly for each zone; ramping up a circulator upon a zone demand; decelerating said circulator on a return temperature increase; providing low speed circulation optimized radiation convective heating; operating convectively during a power loss via thermal mass; and inhibiting hydronic heating convection during off demand cycles.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

As mentioned, actual circulator wattage use is dynamically calculated and displayed. This capability is both a crucial measure of system performance and functions as a test instrument for cause and effect analysis. This capability has been a critical tool, for embodiments, which will be elaborated. While the Delta-T circulator has five selectable operating modes, embodiments importantly utilize only the "DELTA-T MODE" default. Its additional capabilities further witness its technical sophistication.

Embodiments provide enhanced hydronic distribution performance. A primary goal of embodiments is to optimize hydronic distribution efficiency. It is the least understood and most poorly applied element in hydronic heating design and execution. Delta-T Circulator Instrumentation is utilized by embodiments.

Figure 1:
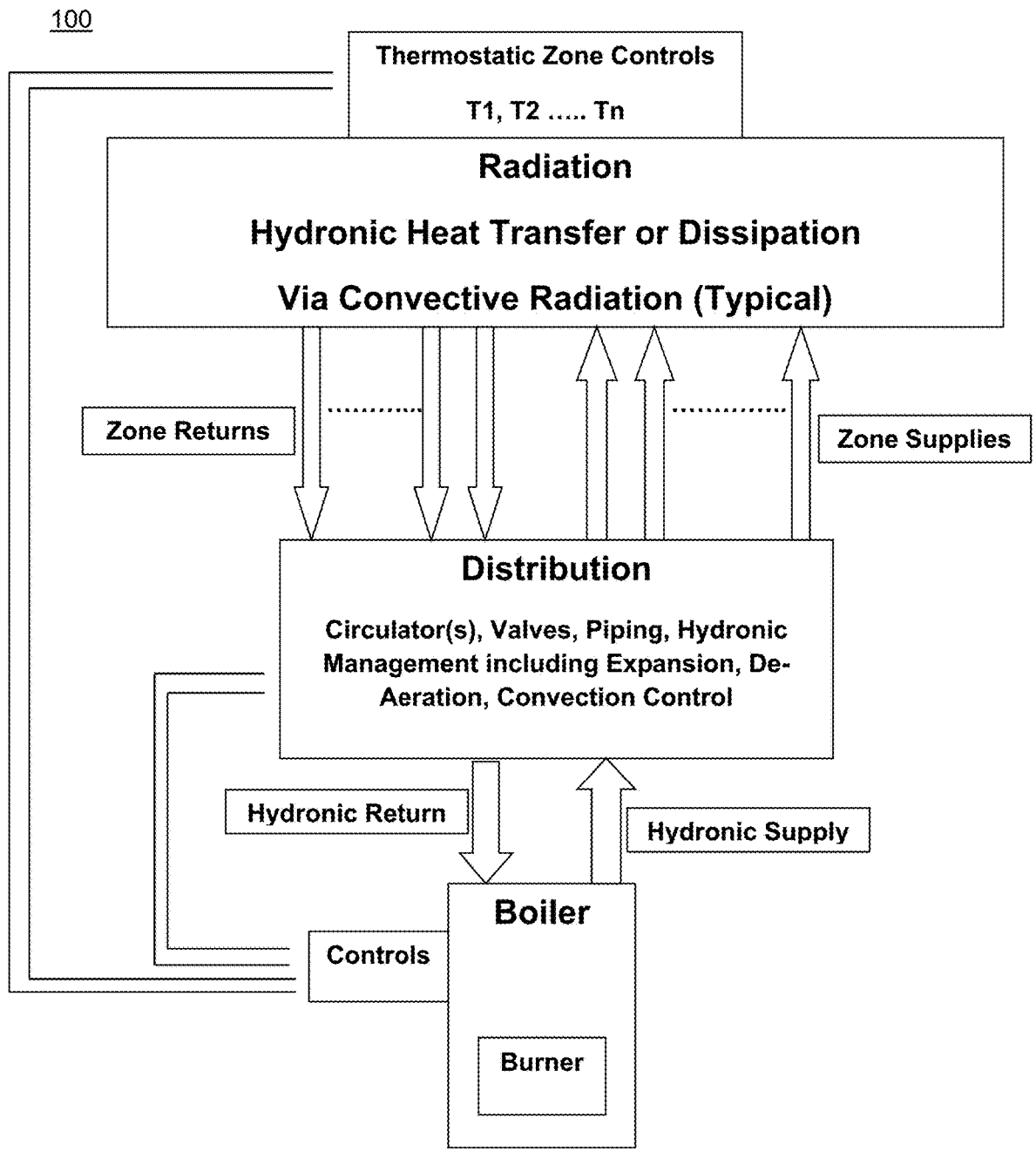
FIG. 1 is a prior art hydronic system.
Figure 2:
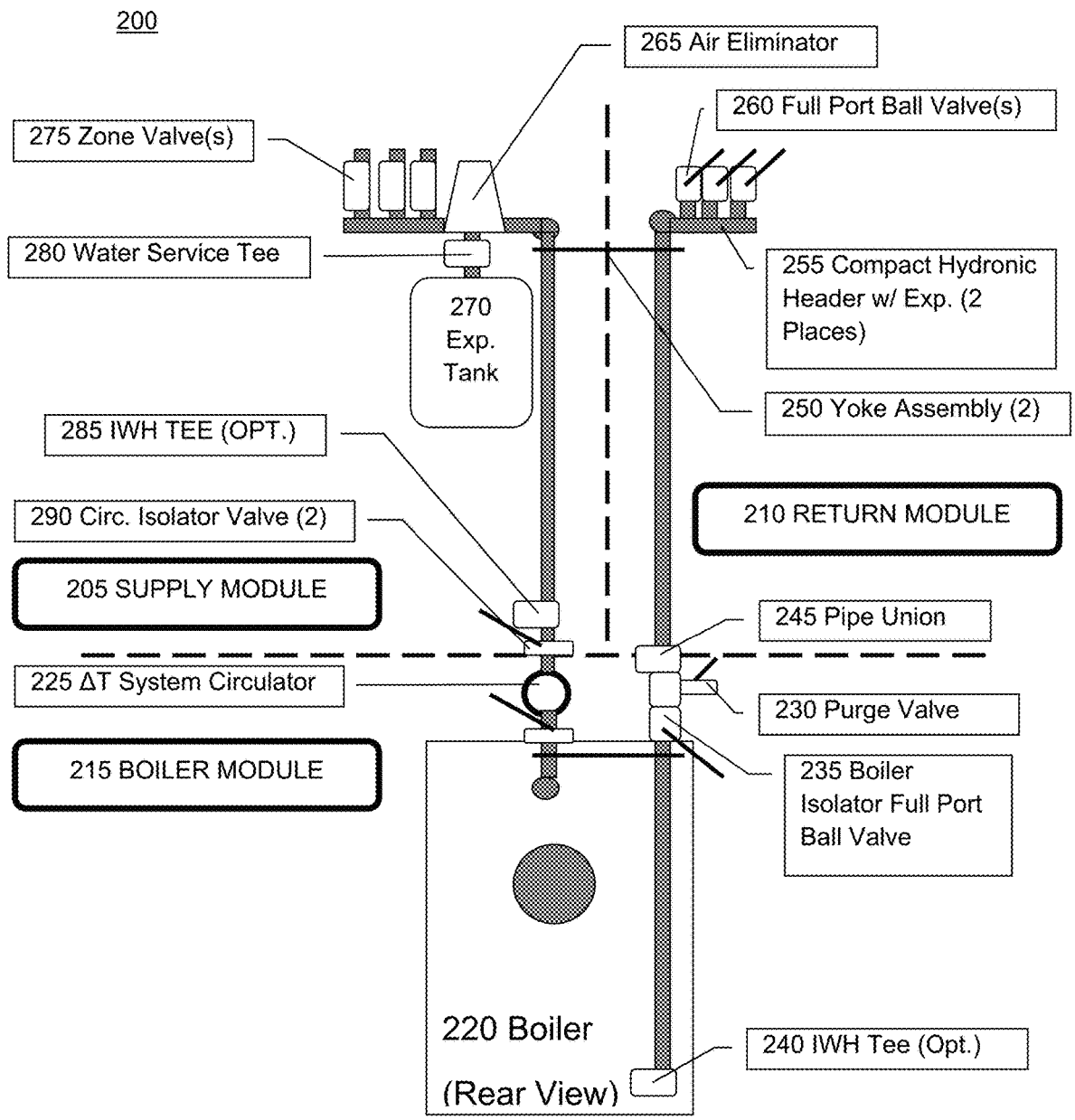
FIG. 2 is a system configuration in accordance with an embodiment of the invention.

FIG. 2 displays embodiment components 200. Components comprise Supply Module 205, Return Module 210, and Boiler Module 215. Boiler Module 215 comprises boiler 220, ΔT System Circulator 225, purge valve 230, boiler isolator full port ball valve 235, and optional IWH Tee 240. Between Boiler Module 215 and Return Module 210 is pipe union 245. Return Module 210 further comprises yoke assembly 250, compact hydronic header w/exp. (2 places) 255, and full port ball valves 260. Supply Module 205 comprises air eliminator 265, expansion tank 270, zone valves 275, water service tee 280, IWH Tee (optional) 285, and circulator isolator valve 290. Embodiments include "Near-boiler" piping optimization. "Near-boiler" piping is defined as that extending from the boiler to the distribution control elements, typically zone control valving, both of supplies and returns. The appliance elements include correct riser (stack) sizing and placement to match system hydronic design output. Embodiments include vertically oriented supply and return risers as closely coupled to boiler tap points as possible. Minimal lateral piping extensions may accommodate a necessary supply manifold air eliminator, and thence zone valving positioning.

Figure 3:
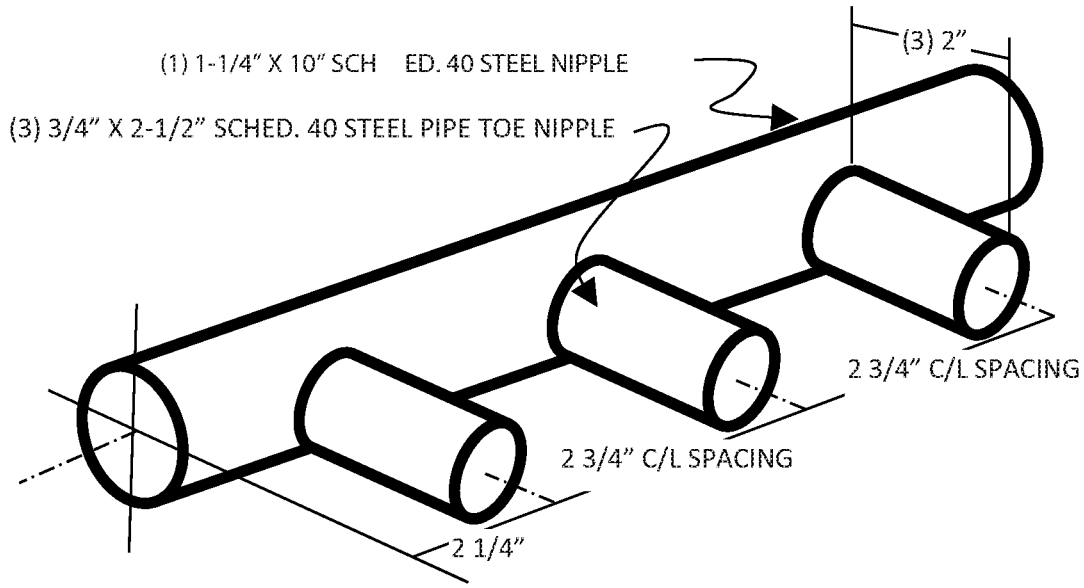
FIG. 3 is a compact steel header configured in accordance with an embodiment of the invention.
Figure 3:
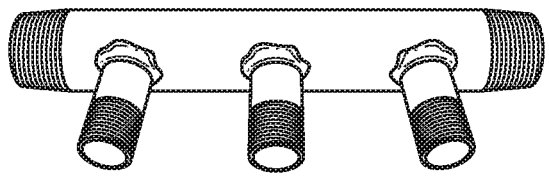
Figure 14:
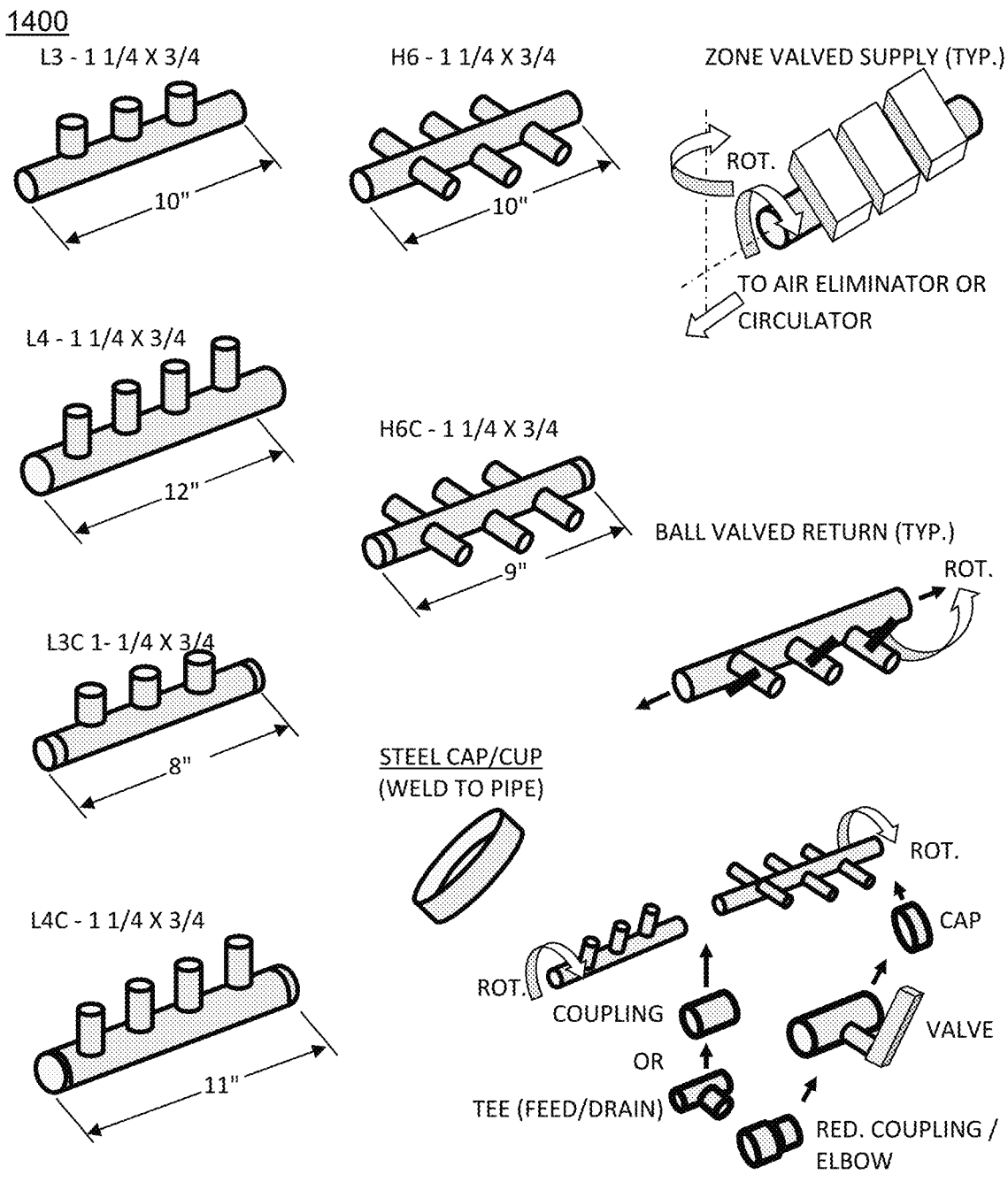
FIG. 14 depicts manifold field configuration examples configured in accordance with an embodiment of the invention.

FIG. 3 depicts a component of embodiments, a Compact Steel Hydronic Header used on both the supply and return laterals to optimize flow. Its primary attributes are the proximate zone valve location and separation per the manufacturer's specification. Populating the header with valves permits modularization with minimal wiring and complexity. Embodiments are symmetric and can have capped ends as required by installation configuration. In embodiments there are two to five taps on the header. Compact header embodiments branch, and can 'T' in one or both directions, therefore doubling capacity to match zone requirements. Importantly, pipe size proportioning is employed to achieve correct flow. If required for flow, pipe diameter can be 1.5 inches rather than 1.25 inches. Embodiments are limited to 1½ inches from the boiler. FIG. 14 depicts additional embodiments and details.

Figure 4:
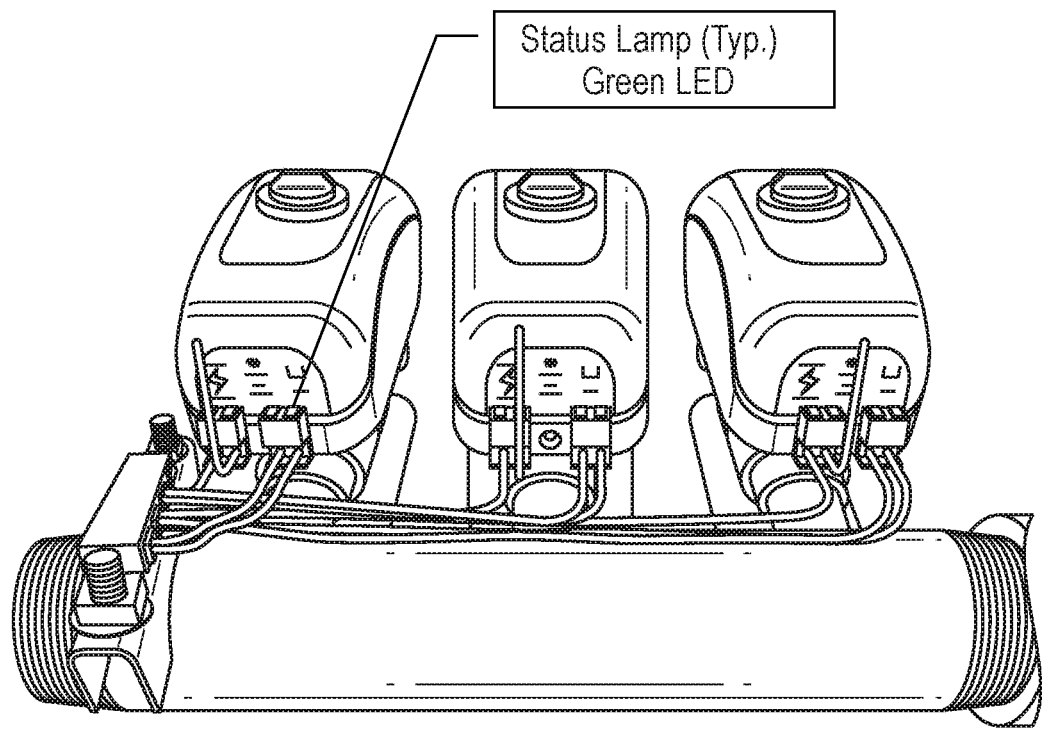
FIG. 4 is a header zone valve assembly configured in accordance with an embodiment of the invention.

FIG. 4 depicts embodiments where assembled header orientation can provide optimum visibility of zone valve "status lamps" as an operational and diagnostic aid. For embodiments, zone valves are ball valves and/or ganged. In embodiments, ball valves are not used in the supply side. To support a system expansion capability, the number of zone valves is expanded with fittings.

Figure 5:
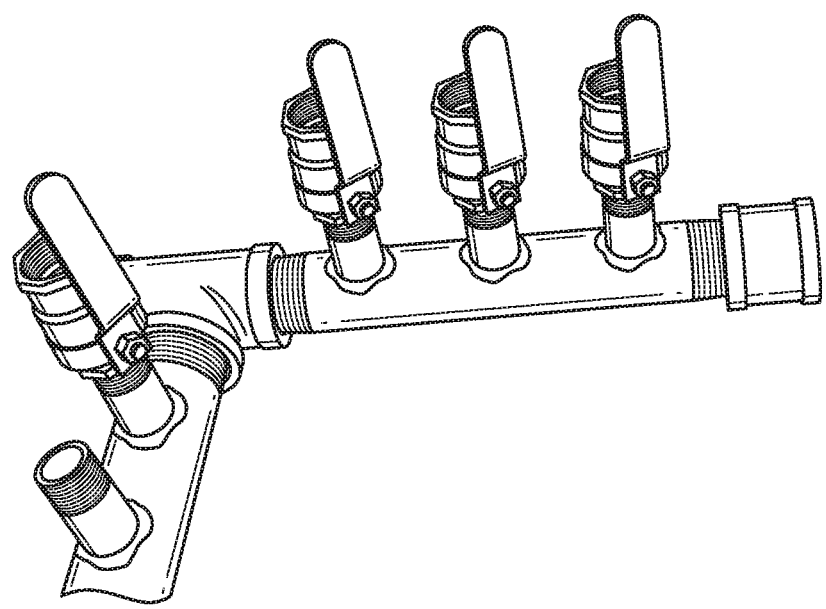
FIG. 5 is a header ball valve assembly configured in accordance with an embodiment of the invention.

FIG. 5 depicts an embodiment where this header also has a complimentary function as a compact packager of zone return ball valving. Placement of a single Delta-T ECM Circulator in the supply stack, as close to the boiler supply tap as practical is critical, and completes delta-t circulator and zone valve supply distribution control (see FIG. 2). This dedicated circulator's capacity matches or exceeds the system demand, serving as the hydronic delivery. Application of full-port ball valving at all necessary control points is important to eliminate flow restriction. As shown in FIG. 5, header assemblies can be combined for additional zones.

Domestic Hot Water (DHW) Generation Efficiency

Figure 6:
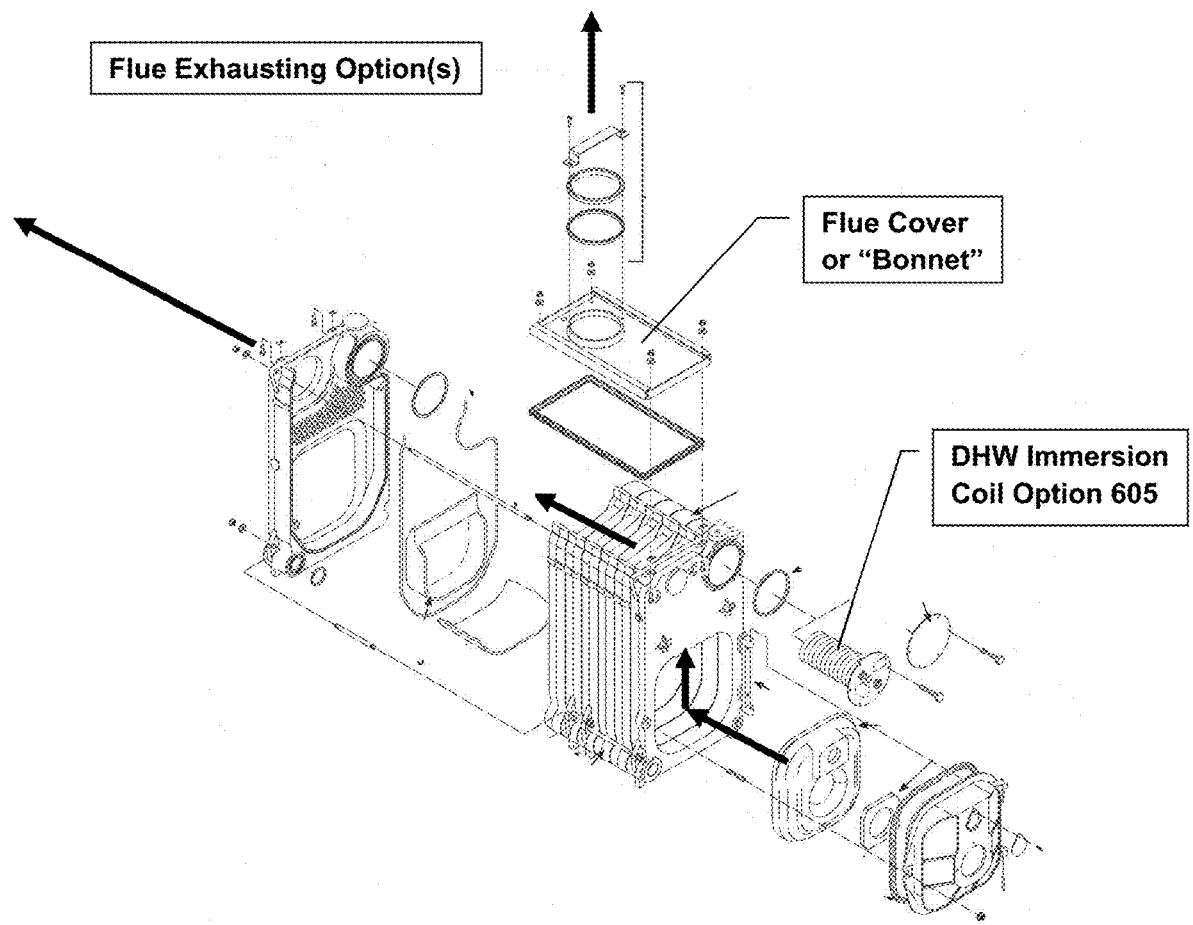
FIG. 6 is a two pass boiler heat exchanger configured in accordance with an embodiment of the invention.
Figure 7:
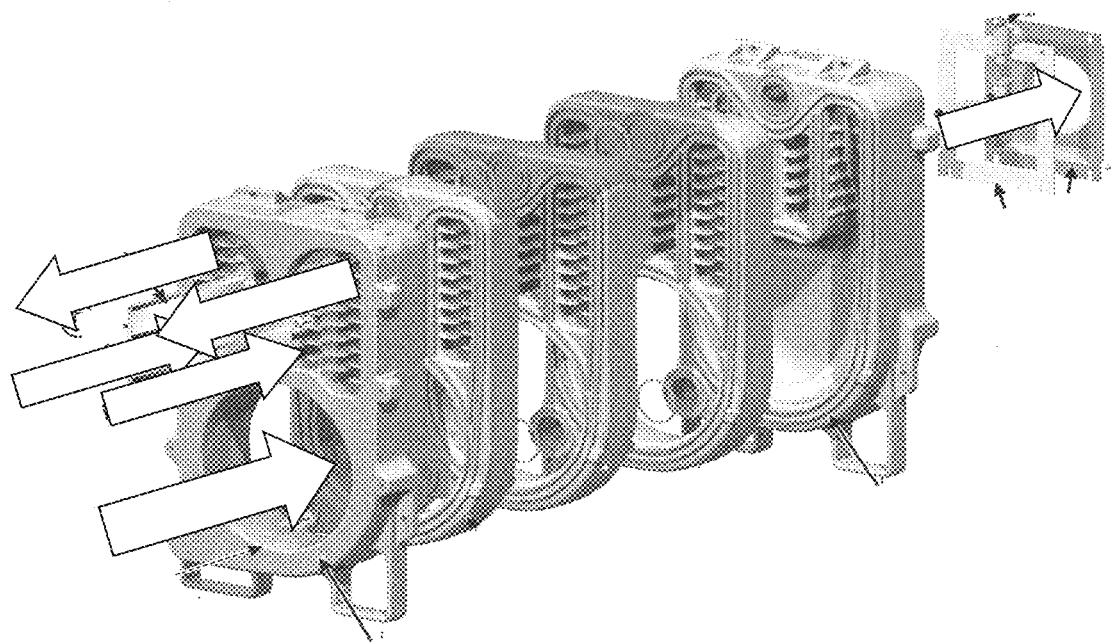
FIG. 7 is a three pass boiler heat exchanger configured in accordance with an embodiment of the invention.
Figure 8:
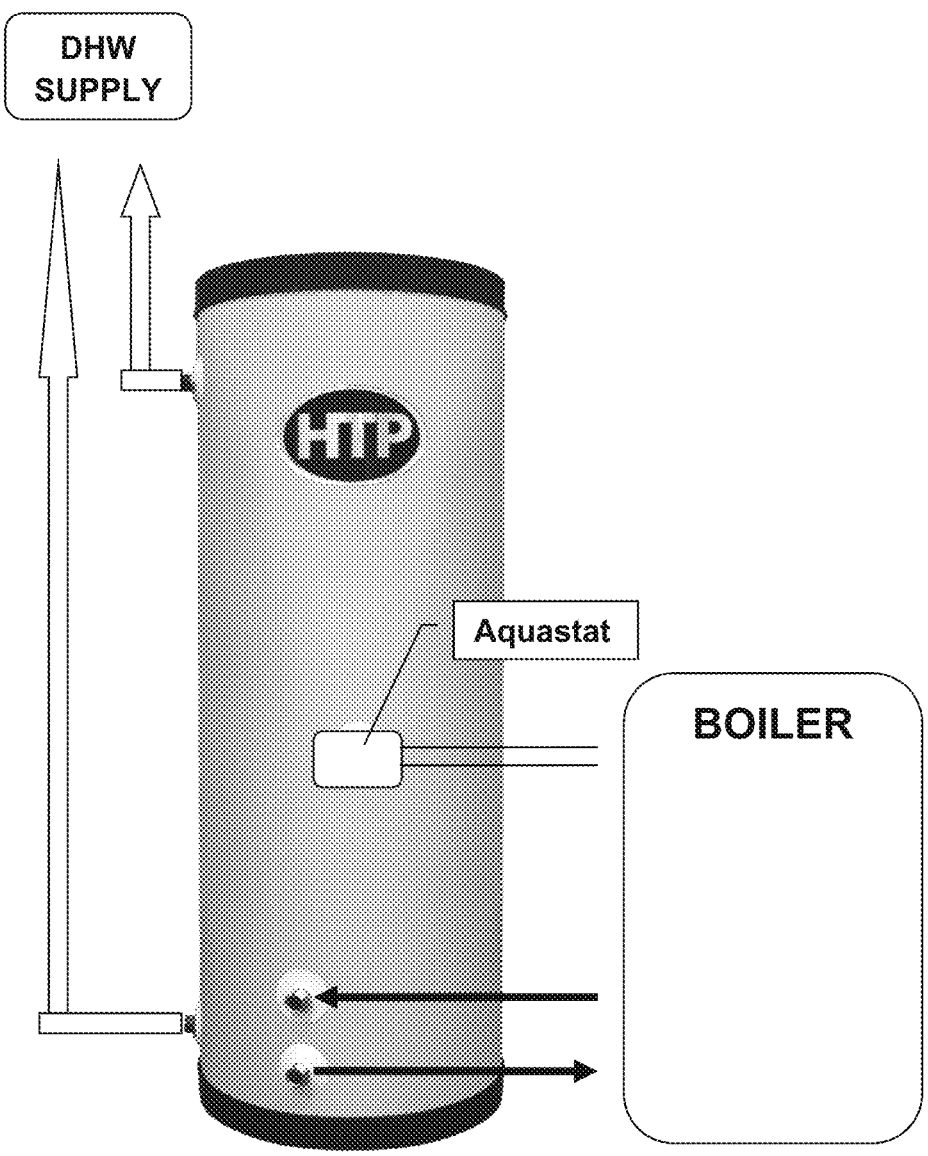
FIG. 8 is an indirect water heater configured in accordance with an embodiment of the invention.

The natural extension of a hydronic (forced hot water) heating system is Domestic Hot Water (DHW) generation. In prior generation "two-pass" boilers, see FIG. 6, an internal direct immersion coil 605 was provided at a modest premium for this task. However, efficiency is compromised in heat exchanger design, and the need for virtual continuous annual operation. Current "three-pass" boilers, see FIG. 7 are more efficient, but at a design penalty of providing heating energy only. Thus, a separate Indirect Water Heater (IWH) with an internal hydronic heating coil to generate DHW efficiently is recommended as an option. When DHW generation is desired, the "near-boiler" piping must provide for an additional zone valve driven by the IHW aquastat for DHW temperature control, see FIG. 8. Ideally the attributes should be: Prioritized DHW Zone demand. In current practice this is provided by an optional Zone Valve or Circulator Relay Panel with a priority switch function provided. De facto prioritization is provided within our near-boiler piping configuration by providing a tap immediately above the system circulator on the supply riser. The IHW Zone return is directed to the boiler return tap. This hydronic "short-circuit" assures priority via the least resistance path. "Close-coupling" (minimal spacing) of the IHW piping to the boiler provides both space and operational advantages that are denoted in further text to follow.

Oil-Fired Boiler Attribute Derivation

Boiler-based hydronic heating systems have traditionally been operated in an ideal temperature range to support convective radiation. This has been generally accepted to be in the 170 to 190° F. range, controlled by a "triple action" or "ranging" aquastat. This was somewhat necessary to support an integral DHW Immersion Coil, as prior discussed. Eliminating this need in contemporary "triple-pass", heating only boilers permits expanded ranging operation, theoretically from ambient to 190° F. This is commonly referred to as "Cold Start Technology", and its employment is now predominant. Cold Start Aquastat Technology application is paramount to achieving hydronic heating system efficiency. Its application however is combustion appliance dependent. Gas-fired only equipment may have "cold start" elements dispersed within its control system whereas oil-fired boilers are typically managed by a "stand-alone" boiler aquastat. System attributes, particularly the number of heating zones, are accommodated with an incremental setting. This varies the system temperature adjustment rate to varying heat demands. This "economizer" feature is switchable as well, if desired. High and Low System Temperature(s) are adjustable to suit the application, if desired. The "hysteresis" or switching temperature differential may also be adjusted to control recovery recycling rate. The Low Temperature may be switched "Off" to dedicate its functionality as a "Cold Starting" vs. as a "Triple Action or Ranging" Aquastat. Therefore it can substitute for or perform as either type. Within the temperature management algorithm is a duty cycle/time capability that increases/decreases the system operating temperature based upon demand(s) duration. This empirically "senses" the indoor/outdoor temperature differential and adjusts the system operating temperature to suit. More finite indoor/outdoor differential tracking compensation can be provided by an optional Outdoor Temperature Sensor (ODS) Option, available on many contemporary products. Boiler Material Selection has been made upon extensive (past and contemporary) field experience. The initial and predominant material has been cast iron in the Industrial Age. More recent material offerings are welded or stainless steel plate and cast aluminum. Their specific metallurgical attributes compliment their product applications: Cast iron is inherently plentiful, moderately convective, good chemical resistance, of high thermal density and durability. Thus its historical predominance as a hydronic (and particularly steam) boiler material. Welded steel plate boilers are a cost-driven alternative to cast iron, but with minimal success. Weld corrosion failures, caused by both process limitations and subsequent water condition and thermal cycling aggravation have severely limited its longevity. They typically have a lesser AFUE (Annualized Fuel Utilization Efficiency) assigned value as well. Stainless steel formed and welded boilers are contemporarily popular in higher efficiency "gas condensing technology" and have elevated AFUE's significantly, but retain construction type expectancy limitations. Poor stainless steel conductivity, despite higher chemical resistance, compromises boiler design at the gain of this longevity. Current Trade Publication Articles are trending to focus on premature "condensing boiler" failures and with scalar implications. Cast aluminum boilers are a very attractive alternative due to their high thermal conductivity advantage and ease of fabrication. Aluminum however has relatively poor chemical resistance, and must be metallurgical-treated. Dissimilar material contacts with fasteners, sensors, seals, piping, etc. have detrimental effects. Boiler water pH must be absolutely controlled as well. All condensing technology and fabricated steel boilers are regressively or null warranted to water condition maintenance. Early field failure experience has forced this regimented service practice, with no supplier warrantee flexibility. Boiler Technology, see FIGS. 6 & 7. Cast-iron boilers are migrating from "two-pass" to "three-pass" configuration for higher AFUE's. Whereas "two-pass" boilers had a common variation of an "immersion coil" for DHW generation, the "three-pass" has omitted this option in favor of overall performance efficiency. Thus "three-pass" boilers are dedicated to heating water only generation. "Three-Pass" boiler configuration denotes an extended, three alternate "folding" of the heat exchanger transfer path to improve efficiency, and is our selection. The supply and return ports are typically on the rear of the exchanger, improving flow efficiency. Our selected "three-pass" exchanger variant has an upper second "fold" dropping to a mid-point final "fold" and exhaust, providing entrapment of further exchanger thermal energy. "Two-pass" boilers typically have vertical heat exchanger flue passages under an accumulation chamber or "bonnet" having a top-of-boiler horizontal (rear) or vertical (top) flue outlet. Flue gas drafting losses are significant by design. "High-mass" cast-iron exchanger construction has the following positive attributes: Higher durability with less susceptibility to "thermal shock" failure, induced by introducing cold water into a heated boiler. Resulting successive "shock" embrittlement leads to eventual metallurgical failure (cracking). Greater energy storage capacity of a "high-mass" boiler dampens system demand variations while reducing combustion equipment cycling, significantly extending operational life.

Hydronic System Specification

Conventional hydronic heating systems are specified from a predetermination of application attributes, typically: Application heat loss requirement, preferably determined via a "Heat Loss Calculator", considering both structure energy detail and regional environmental values of degree-days requirement and lowest temperature design value. It typically includes heat loss determination of heating sub-entities (rooms, spaces, areas, etc.) as desirable. Combustion fuel selection is specified and exhausting method defined. Boiler selection and capacity is matched to total heat loss requirement. Number and type of heating zones are defined. Radiation types and sizing are specified (in new systems). Conventional and delta-t hydronic systems require and employ the same application attributes as above, but delta-t system components, their placement and operation differ.

Delta-T Hydronic System Configuration

A differential temperature (delta-t or ΔT) managed hydronic heating system contains the basic elements as its contemporaries. However, its physical and technical characteristics provide unique configuration opportunities from its attributes, see FIG. 2. Importantly, embodiments include no multi-function devices, greatly enhancing fault diagnostics, decreasing repair labor, and reliability. This is in contrast to today's strong tendency to combine multiple functions in ever more complex parts. Regarding modularization, a delta-t hydronic heating system configuration is logically divisible into functional elements as follows.

Boiler Module

Figure 10:
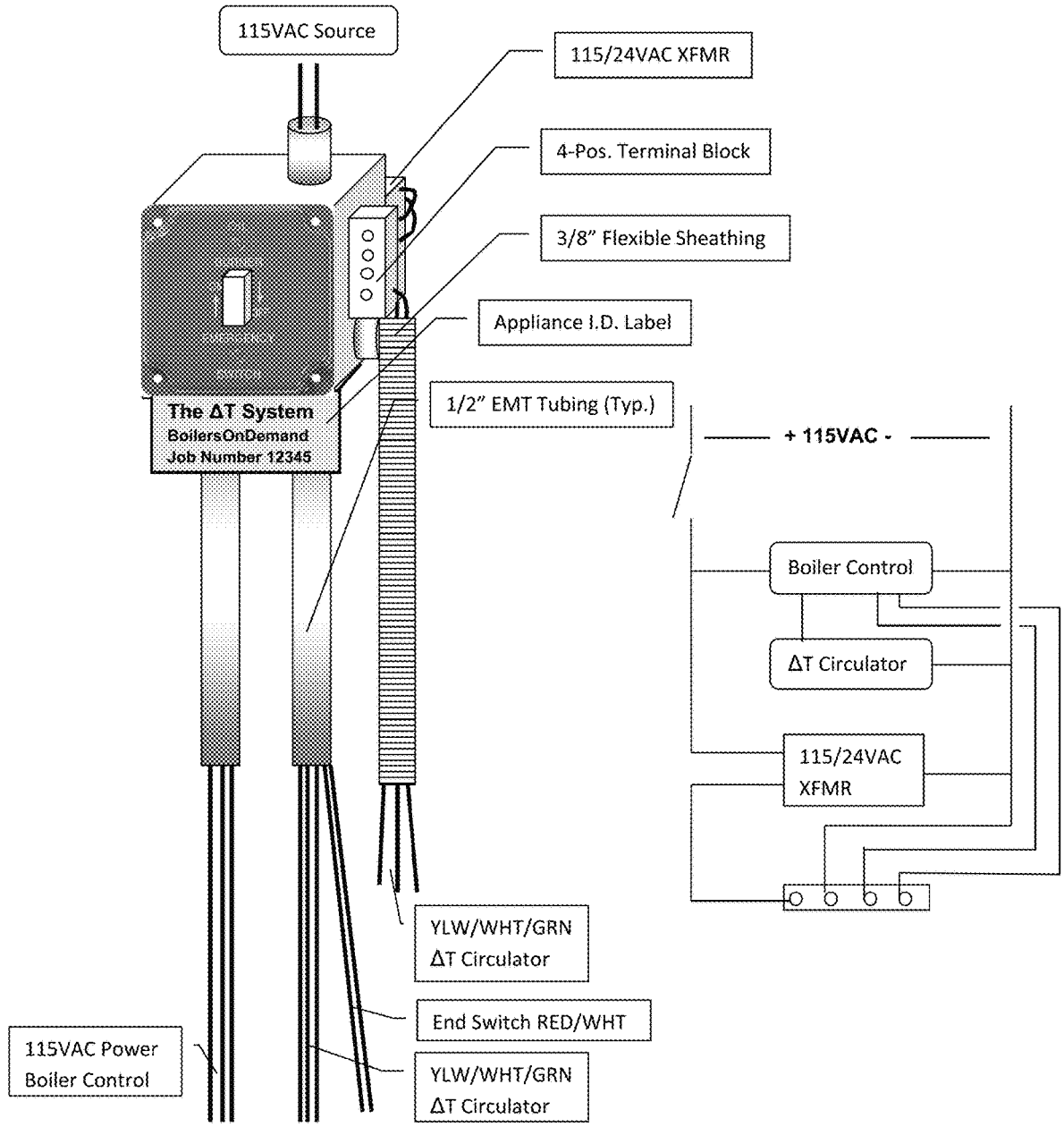
FIG. 10 is a boiler module wiring assembly configured in accordance with an embodiment of the invention.

Heat generation and control consisting: A "high-mass" cast-iron boiler with capacity increments, affected by the number of "sections" (and hence capacity) selected. Immediate boiler control piping and circulation provided by supply and return pipe risers including the delta-t circulator and isolator ball valve respectively. A natural modular delineation and juncture is provided by a circulator isolator flange valve and a pipe union on the supply and return risers respectively. A system wiring sub-assembly is enabled and integrated within the boiler module, see FIG. 10. It comprises a system emergency/service switch with fuel type indication, separate 115 VAC power distribution to the boiler (and its aquastat), and the delta-t system circulator. A 24 VAC Transformer provides power to the zone valve(s). End Switch wiring (enabling system aquastat operation) is between the aquastat T-T terminations and a terminal block. A 4-terminal block for 24 VAC and End Switch connectivity are components.

Supply Module

Figure 9:
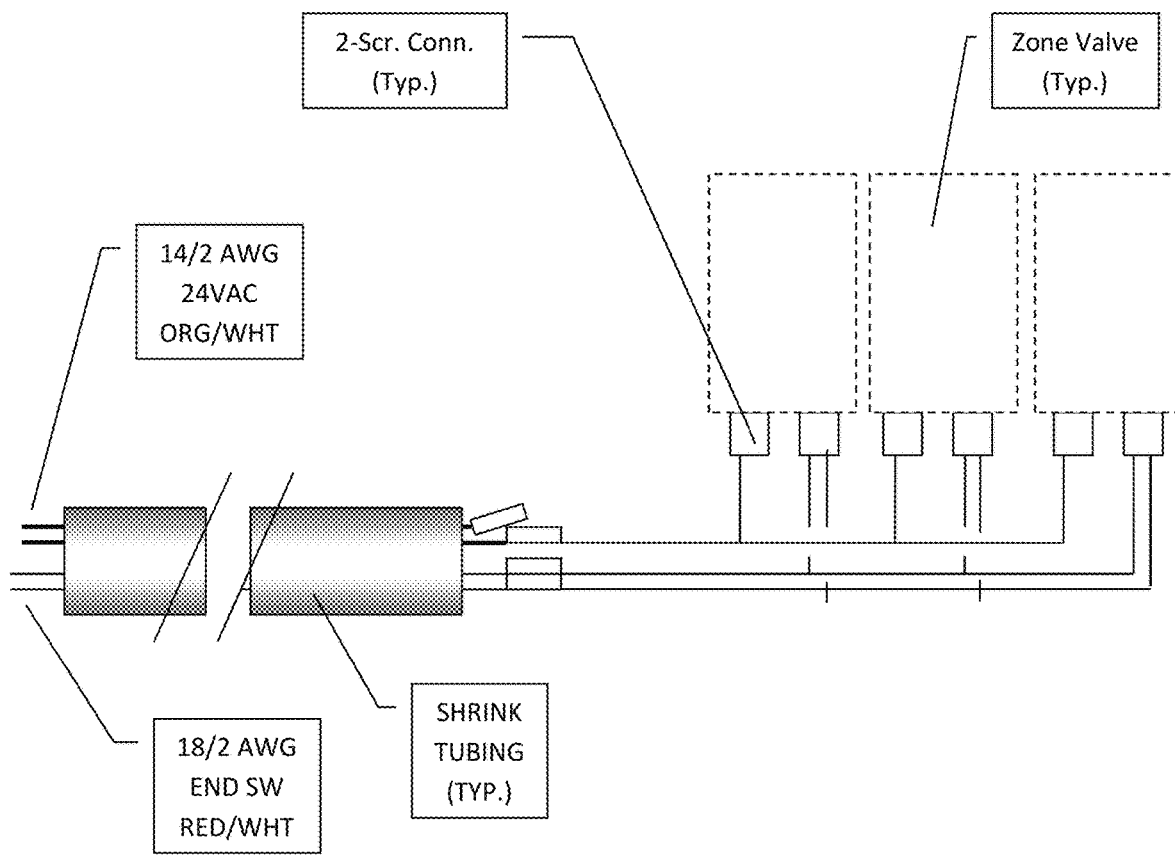
FIG. 9 is a zone valve wiring harness configured in accordance with an embodiment of the invention.

A Supply Module provides hydronic distribution supply and control. Includes the necessary serial delivery elements of: A Taco® 4900 Series Air Eliminator minimizing leader piping requirements provides further structural and thus distribution compaction. It is further structurally robust, permitting a free-standing structure with minimal risk. An air eliminator bottom tapping with tee, dually utilized for system water service, including a 12-15PSI water service regulator and code backflow preventer. The system hydronic expansion tank is included. The expansion tank is typically supplied loose piece and assembled on site to prevent component damage due to the vulnerability of the tank and nipple construction and the mass of the supply manifold. A Compact Steel Hydronic Header available in 2, 3, 4 or 5 Taps is designed to minimize the hydronic flow path while permitting future expansion(s). Its compaction is limited by the following attachment of zone valves to the minimum spacing(s) defined by their manufacturer. A quantity of zone valve(s) deployed along the header to suit system requirements, see FIG. 4. This valve deployment and subsequent orientation provides a visual display of zone valve intelligent "status lamp(s)". It supplants a contemporary circulator relay or zone valve indicator panel at substantial economic offset and with greater operational and diagnostic functionality. A 4-Wire Harness sub-assembly with appropriate distributed termination(s) to service the zone valve(s) functions. See FIG. 9. This harness is preassembled into the Supply Module with 4-wire harness end loose to wire to Boiler Module Service Switch Terminal Block at system assembly.

Return Module

The return module provides hydronic distribution return zone isolation valving as required. It permits manual individual zone "purging" (de-aeration) in conjunction with the boiler isolation valve lockout and attendant drain valve. The latter are located within the Boiler Module return riser. A Fuel-specific Power Burner is defined by the application and assembled on site. Options comprise #2 Fuel Oil, Natural, or LP (Liquid Propane) Gas. Gas burners are typically fuel type adjusted on site with manufacturer provisions. Installation Kit(s): These are installation-specific and "loose-pieced" aggregations of components and therefore not provided as a "module" or "kit". Radiation as a Hydronic System Element is not considered nor accommodated within our submission. It is necessarily site-specific. The configuration integrates all other hydronic heating elements into a packaged "appliance" as will be further detailed.

Delta-T Hydronic System Assembly

FIG. 2, as mentioned, displays a system embodiment 200. Referring to the prior-defined "modules", an assembled system is achieved as follows: The Boiler Module is the free-standing system base, incorporating all heat-generation functions and related controls. A rigid-piped "Yoke Assembly" comprised of a hinged pipe clamp pairing between supply and return risers with a dimensioned spacer rod is a structural device. It is secured between the supply and return risers to maintain vertical pipe spacing integrity. The Return Module is vertically oriented and loosely assembled to the Boiler Module Return Riser using the mating pipe union. Another "Yoke Assembly" is loosely affixed near the upper riser with the other hinged yoke end opened to receive further assembly. The Supply Module is up-righted and simultaneously located onto the Boiler Module supply circulator flange and into the return yoke. The hinged clamp is closed, grasped and securing screw loosely assembled. The circulator and valve flanges are bolted to secure. The 4-wire zone valve harness is terminated to the connector provided on the Emergency/Service Switch Electrical Box. Preferred site supply and return valving orientations are ascertained by rotation of both riser-based Supply and Return Modules. The loose-pieced Expansion Tank is taped and assembled to the supply module at the dropped tee on the Air Eliminator. The preferred supply orientation is ascertained and the circulator flange hardware tightened. The rotational freedom as supplied is approximately 135°. Subsequently between the air eliminator and the expansion tank the System Water Service Assembly tee can be rotated to compliment site supply sourcing. Rotational freedom is typically over 180°. The return module has full rotational capability. Preferred orientation is determined and the base pipe union tightened. The yoke assembly clamps are final positioned and tightened. The loose-pieced appropriate Power Burner is assembled and terminated, completing the system "appliance" configuration.

Delta-T Hydronic Heating "Appliance" Functionality

Figure 11:
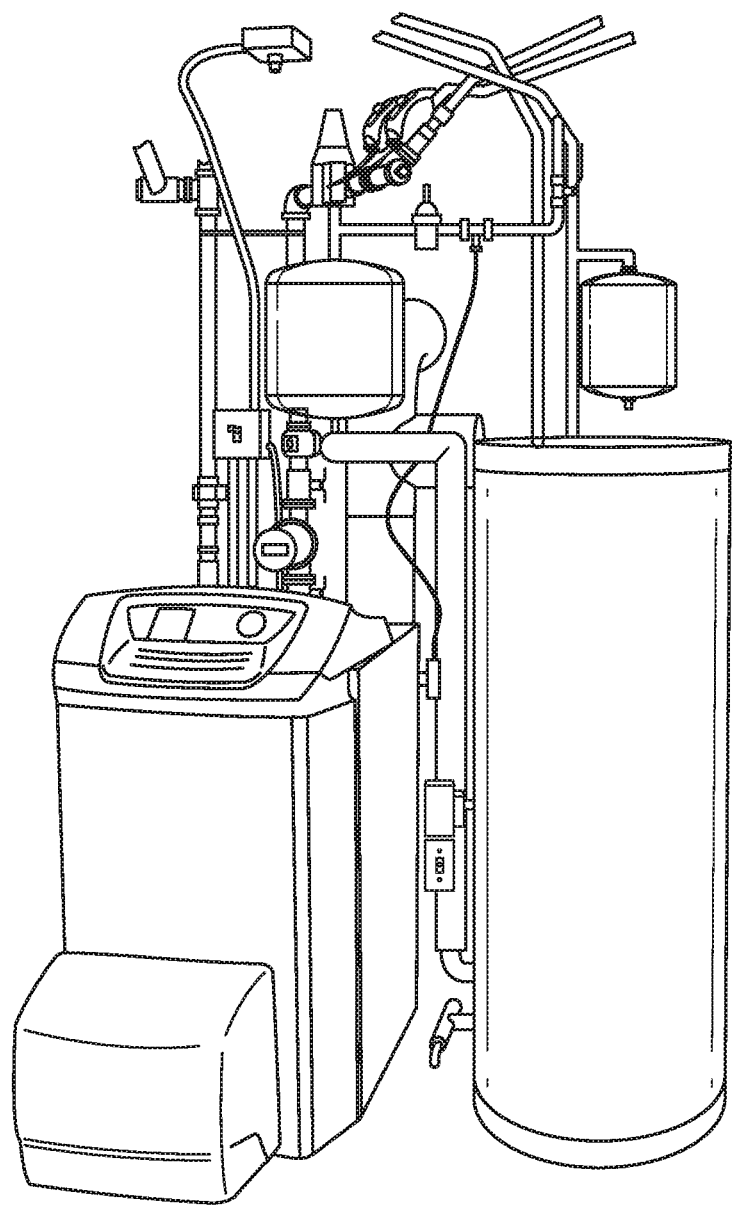
FIG. 11 is a delta T appliance overview with enhanced convection depiction configured in accordance with an embodiment of the invention.

FIG. 11 The assembled system as detailed comprises a free-standing hydronic heating appliance. It incorporates all the elements of a complete heating system, excluding radiation. Radiation is necessarily a site determined, configured and installed activity, thus negating its appliance integration potential. Purposefully designed as an integrated, structurally sound, free-standing appliance it can receive without compromise all attendant component terminations, facilitating on-site installation complexity and risk. This applies equally to both new and replacement heating system installations. They are briefly: Flue gas exhaustion, Fuel supply piping, Electrical power sourcing, System water sourcing, Zone supply & return piping extensions, and Zone thermostat wiring terminations. These elements constitute the extended labor and materials content required to complete a hydronic heating system installation. As a packaged "appliance", performance is necessarily predefined and executed at minimal risk vs. an on-site defined and piece assembled system. Component selection and application is predicated upon total system functionality. Service and Maintenance is facilitated both by individual component selection and placement. As configured all system operation, maintenance and service components are visible and accessible within an arm's reach. Very importantly, Turn-Around-Time (TAT) can be minimized with pre-built construction.

Delta-T Hydronic Heating Appliance Operation

Appliance operation retains and expands upon all the characteristics of a contemporary hydronic heating system, excepting to display dynamic hydronic distribution attributes via the delta-t circulator multi-function display. Specific operational detail is as follows: The system circulator employed is a Taco® VT2218-HY1-FC1A01 Delta-T ECM Circulator, a multi-functional appliance being operated in "DELTA-T MODE" only. ECM is defined as "Electronically Commutated Motor" powering with enhanced operational characteristics. Employing pulse modulation and frequency variability, starting torque is multiplied and virtually negates motor & pump debris induced stalls, the bane of hydronic circulators. The firmware "ramping" profiles within the circulator logic manage hydronic delivery for enhanced operation. The circulator in "Delta-T Mode" manages a hydronic heating circuit performance via infinite speed control (pumping output) by utilizing two temperature sensors on the respective supply and return. A preset temperature differential ($\Delta T$) is maintained for idealized convection heat transfer. Value is adjustable between 5° and 50° F. to accommodate radiation attributes. Manufacturer claims of up to 85% electrical power and 15% fuel consumption claims with this device have been both substantiated and exceeded in this application. Complementing the dedicated delta-t system circulator are high efficiency, electronically actuated ball zone valves. Zone valve status lamp(s) indicate operation and potential fail modes. They execute thermostatically controlled zone heating demands using minimal power between demand cycles. Located at the high point of the supply module, a secondary function is to inhibit hydronic heating convection during off demand cycles. The air eliminator is situated between the system circulator and zone valve(s) on the short lateral stack extension. This architecture provides for continuous hydronic air evacuation from the boiler. During system operation, heating demand by one or more zones initiates circulator propulsion that continuously adjusts its supply rate via $\Delta T$ control, satisfying heating demands. During demand periods the hydronic heating supply is dampened by the thermal storage mass of the high-mass boiler. Otherwise the system circulator, zone valves and boiler remain unpowered and at rest.

Enhanced Convection Augmentation of Delta-T Systems

Hydronic convection is the natural attribute whereby heated water will rise to the top of a particularly vertical column or circulate within a closed loop. It will also work within a declining loop where there is sufficient temperature differential to initiate circulation. On all powered hydronic systems particular attention must be taken to inhibit convection in heated supply lines by means of flow-check valves, located on horizontal near-boiler supply lines or within zone circulators where applicable. The beneficial flow enhancing effect of hydronic convection is totally ignored within hydronic design formulae and subsequently not considered in hydronic heating system design or execution. The argument must be made that in contemporary powered systems its effect on system performance is neither evident nor measurable. Delta-T hydronic distribution operates at much lower flow rates for idealized radiation heat transfer. Combine this with properly configured risers (stacks) and compact manifolds in near-boiler piping, now convection becomes both significantly enhanced and measurable. A delta-t zone demand begins with a circulator ramping up and exhibiting corresponding wattage consumption. Upon receiving a return temperature increase, the circulator decelerates to achieve the $\Delta T$ setting. Once achieved the circulator wattage decays until the wattage indication (and speed) is minimal. The values will vary somewhat, but Taco® Engineering advises that a typical zone in normalized operation should indicate about 20 W+/−consumption. All of embodiment zone consumption values indicate 8 to 13 W, without exception. A single Taco® 007 Fixed Speed Circulator in the same application would continuously consume up to 80 W, given pumping head (flow resistance) conditions. Furthermore, common contemporary practice is to apply dedicated fixed speed circulators to every zone.

Fuel Consumption Differential of Delta-T Hydronic Systems

Taco® promotes observations of up to 15% fuel savings along with the electrical energy reduction of their VT2218 Delta-T ECM Circulator. Embodiments show modestly extended circulation times at lower system operating temperatures with no appreciable increase in fuel burner firing times. Further observed is an apparent reduction of between-cycle radiation convection cooling effects, if any. Both of these would indicate stabilized heated air convection.

Convection Effect in Delta-T Hydronic System Fail Modes

Ever-present hydronic convection is masked and not considered in conventional, over-sped hydronic heating distribution systems. The introduction and application of delta-t circulation technology featuring ideal, low speed circulation to optimize radiation convective heating efficiency amplifies its benefits. An enhanced convection hydronic heating appliance has extended benefits beyond those detailed in the preceding section under varied unpowered operation. The internal flow check valve supplied with the ΔT circulator is not installed! Its use impedes any operational convective effect. The ODS Option available on the boiler aquastat is not used. It interferes with fail mode operation as described in the following.

Circulator Failure Operation

The dedicated delta-t system circulator employed uses a high-pass volute (impellor) to induce circulation. This characteristic allows flow during unpowered (static) operation. The convection effect witnessed in our configuration follows: A demand initiated by any and eventually all heating zones initiates the boiler aquastat to unsuccessfully activate the failed circulator. The boiler aquastat employed, the Hydrolevel 3250-Plus "Fuel Smart", has demand intelligence incorporated that deduces an extended unsatisfied demand is occurring and logically increments the system operating temperature upward, firing the power burner to satisfy. This routine repeats to the point that the system high temperature preset is satisfied. This is normally in the 172 to 180° F. range, considering system hysteresis. Natural convection begins with the opening of any zone valve(s). However its effect increases with temperature differential and tracks the aquastat activity previously described. Zone demands are attempted to be satisfied by enhanced convection but the results are mixed, predetermined by physical and thermal variables. Outside the scope of our "appliance" configuration, these observations are presented for reference. Temperature differential increases convection effect. Zone radiation configuration is paramount. Thus in existing installation the effectiveness varies dramatically, from substantial to no through flow. In our experience a "split loop" zone typically surpasses a "series loop" zone in convection performance. Zone piping length is important, and particularly considering the number of piping offsets (45° and particularly 90° elbows) and risers employed. The shorter and less restrictive the piping, the greater the convection effect is realized. Air pockets typical of improperly purged (or vented) zones will seriously affect or negate convection. Convection is always introduced and exhibited on the above-appliance supplies, proceeding through or terminating within radiation zones subject to their configuration. Convection may physically reverse on a below-appliance zone, depending upon riser configurations. Close-coupling an Indirect Water Heater (IWH) Option per our appliance configuration is effectively the shortest zone and thus a de facto priority loop. IWH operation in "failed circulator mode" typically exhibits little to no effect upon DHW generation. Summary: Enhanced convection is always exhibited by our delta-t heating appliance with varied effect. These convection observations are supported by and are coincident with those observed on our personal multi-fuel, multi-mode hydronic system. It will and has fully heated our home with no electric power for extended storm periods when using our solid fuel option.

Zone Valve Failure(s)

The zone valve designated in our application is the Taco® Zone Sentry™. It has a manual selector feature on its actuator head along with a "status lamp" indicating operation state. Merely using the manual feature to open the valve restores operation in all applications, delta-t induced convection or not. An actuator head failure in "fail open mode" will typically overheat the affected zone under powered circulation. Removing the quick-release head and rotating the ball actuator stem will remedy, albeit a trial and error determination. A faulty actuator head replacement on a Taco® Zone Sentry™ Valve takes less than twenty (20) seconds.

Power Burner Failure Operation

Absence of energy replacement relegates any hydronic system to eventual energy dissipation to an ambient temperature state. The advantage of the Enhanced Convection Appliance as defined is a higher typical thermal mass. The addition of an IWH extends thermal capacity by reversed circulation (discharging) of the IWH DHW charge into area heating.

Full Electric Power Failure Mode

Compared to a contemporary hydronic heating system that substantially statically radiates its latent energy when unpowered, an enhanced delta-t managed system provides temporary area heating when manually actuating zone valves as prior noted. It can further effectively delay system freezing by both positively and negatively following heating degradation. This effect is again limited by zone piping attributes as prior noted.

Appliance Embodiment Examples

Original single function sine wave delta-t circulators field performance was not stellar. More recent, advanced components were needed to support development embodiments. A Taco® VT2218 00e Series Delta-T ECM Circulator, and specifically the VT2218-HY1-FC1A01. Taco® was used in systems. Six heating appliances have yielded the following field data: Fuel Consumption Reductions: 25 to 45%, Variable, dependent upon prior replacement configuration and attributes. Average System Replacement Age: 18 Years. Estimated Appliance Economic Life: 30+ years, Average Prior Operating Temperature: 170° F., Average New Operating Temperature: 145° F. (Est.), Combustion Fuel: #2 Heating Oil, Power Consumption: delta-t wattage and power burner cycling observations infer a substantial reduction. Observed installed configuration attributes as compared with typical contemporary hydronic heating systems: All appliance piping is contained within the footprint of the boiler, extended with an approximate 12" piping zone to the rear and vertically to suit. Total area consumed (including an IWH option) is typically one-third or less of contemporary heating system installations. Piping and valving is up to one-half that employed in typical contemporary installations. The aggregate of all cast-iron, steel, brass and bronze construction maximizes the resistance to water contaminants and acidity, substantially increasing service life. Service life is estimated to be two to three times longer than a low-mass condensing boiler, including near piping and accessories. Installed system cost is typically 60 to 80% that of contemporaries, subject to locale. Combustion fuel options available with no appliance alterations required excepting the power switch nameplate fuel designation.

Figure 12:
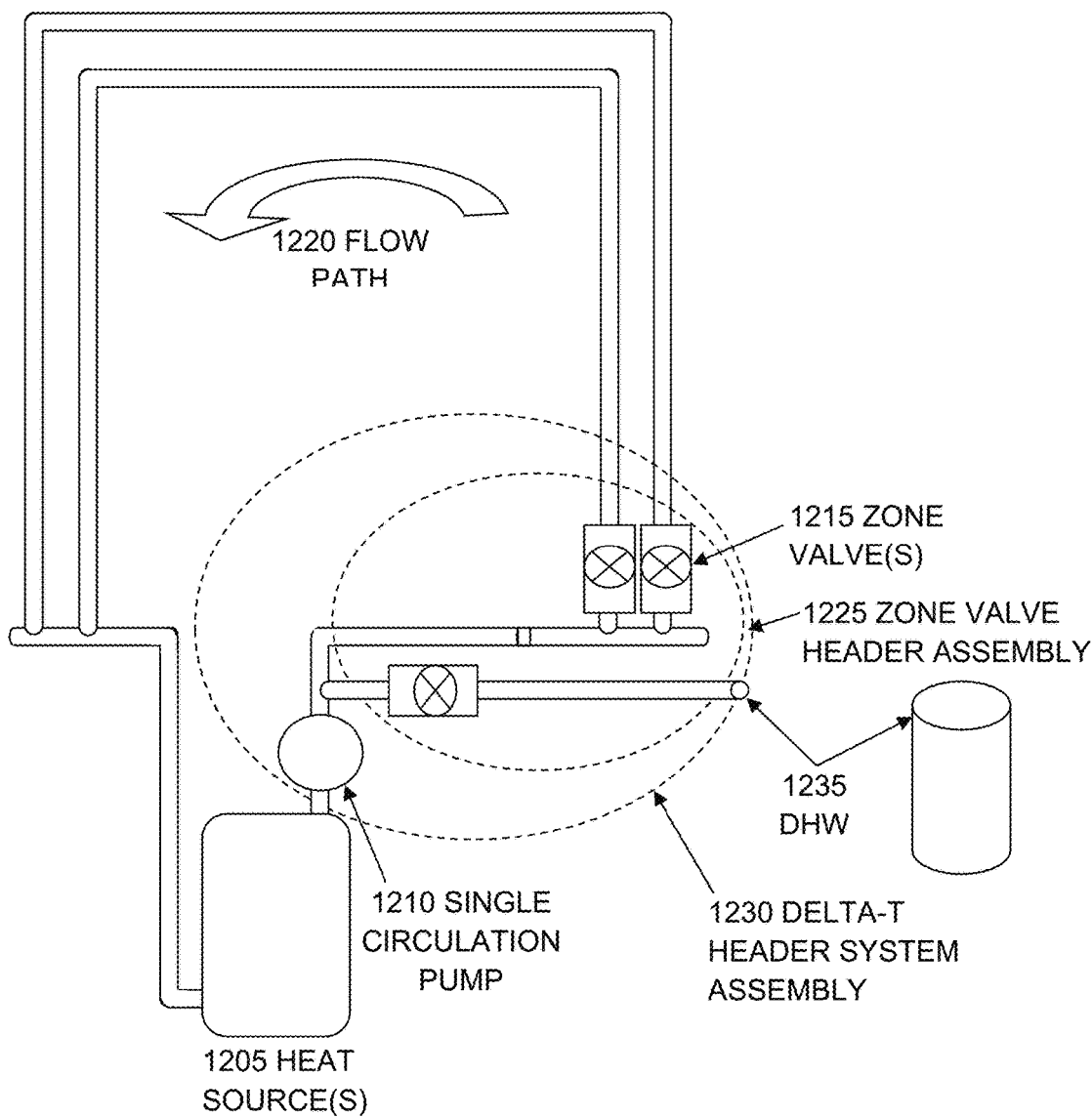
FIG. 12 is a system overview diagram configured in accordance with an embodiment of the invention.

FIG. 12 is a system overview diagram 1200. Heat source(s) 1205 is/are connected to single circulation pump 1210. Pump 1210 feeds zone valve(s) 1215 feeding flow path 1220. Zone valve(s) 1215 and zone valve header form zone valve header assembly 1225. Pump 1210 and zone valve header assembly 1225 comprise delta-T header system assembly 1230.

Figure 13:
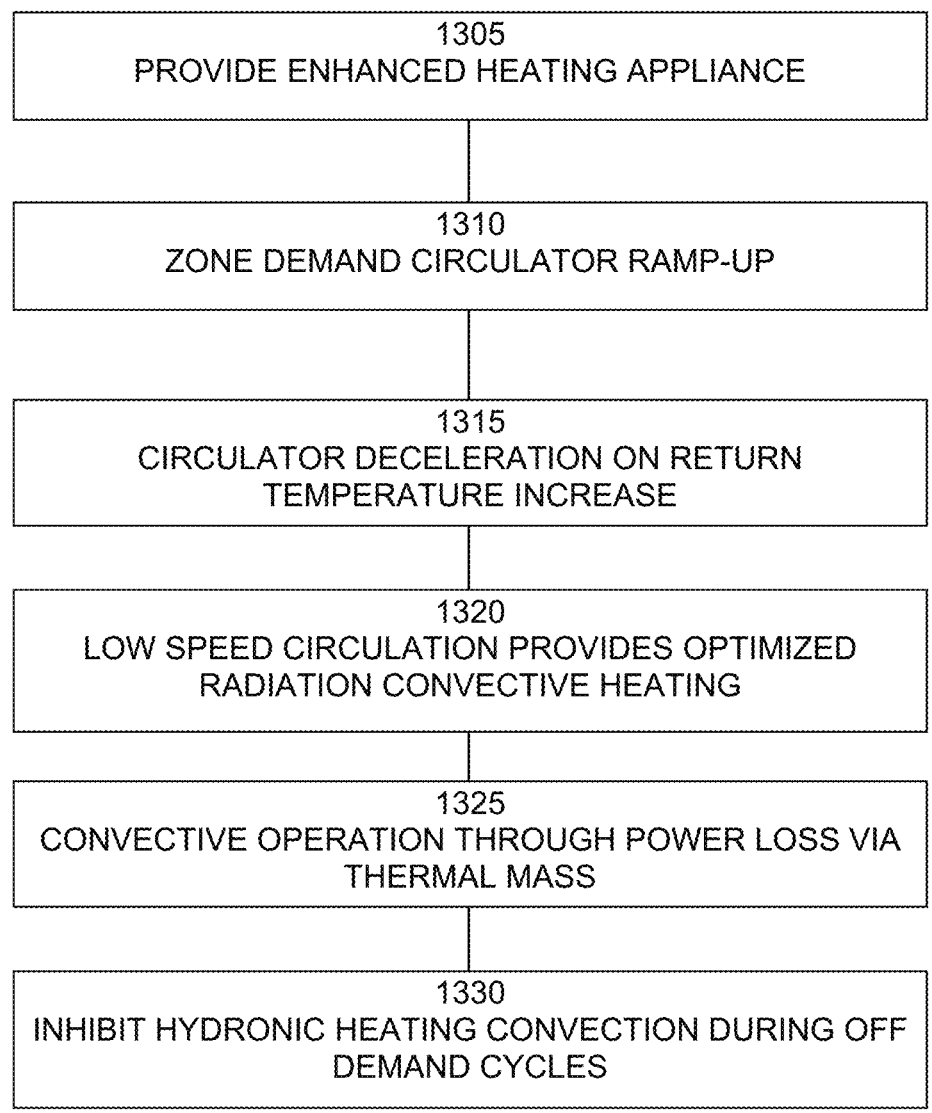
FIG. 13 is a flow chart of a method configured in accordance with an embodiment of the invention.

FIG. 13 is flow chart 1300 of a method. Steps comprise providing an enhanced heating appliance 1305; zone demand circulator ramp-up 1310; circulator deceleration on return temperature increase 1315; low speed circulation providing optimized radiation convective heating 1320; convective operation through power loss via thermal mass 1325; and inhibiting hydronic heating convection during off demand cycles 1330.

FIG. 14 depicts manifold field configuration examples 1¼×¾ systems 1400. Included are examples L3, L4, L3C, L4C, H6, and H6C, plus a steel cap welded to pipe in embodiments. Embodiments are capped on one end, and taps are ¾"×2"×2" on 2½" centerlines. In embodiments, 2½ inch spacings are replaced by 2¾ inch spacings for flow considerations. Typical zone valve supply and ball-valved return are shown with combination options.

Figure 15:
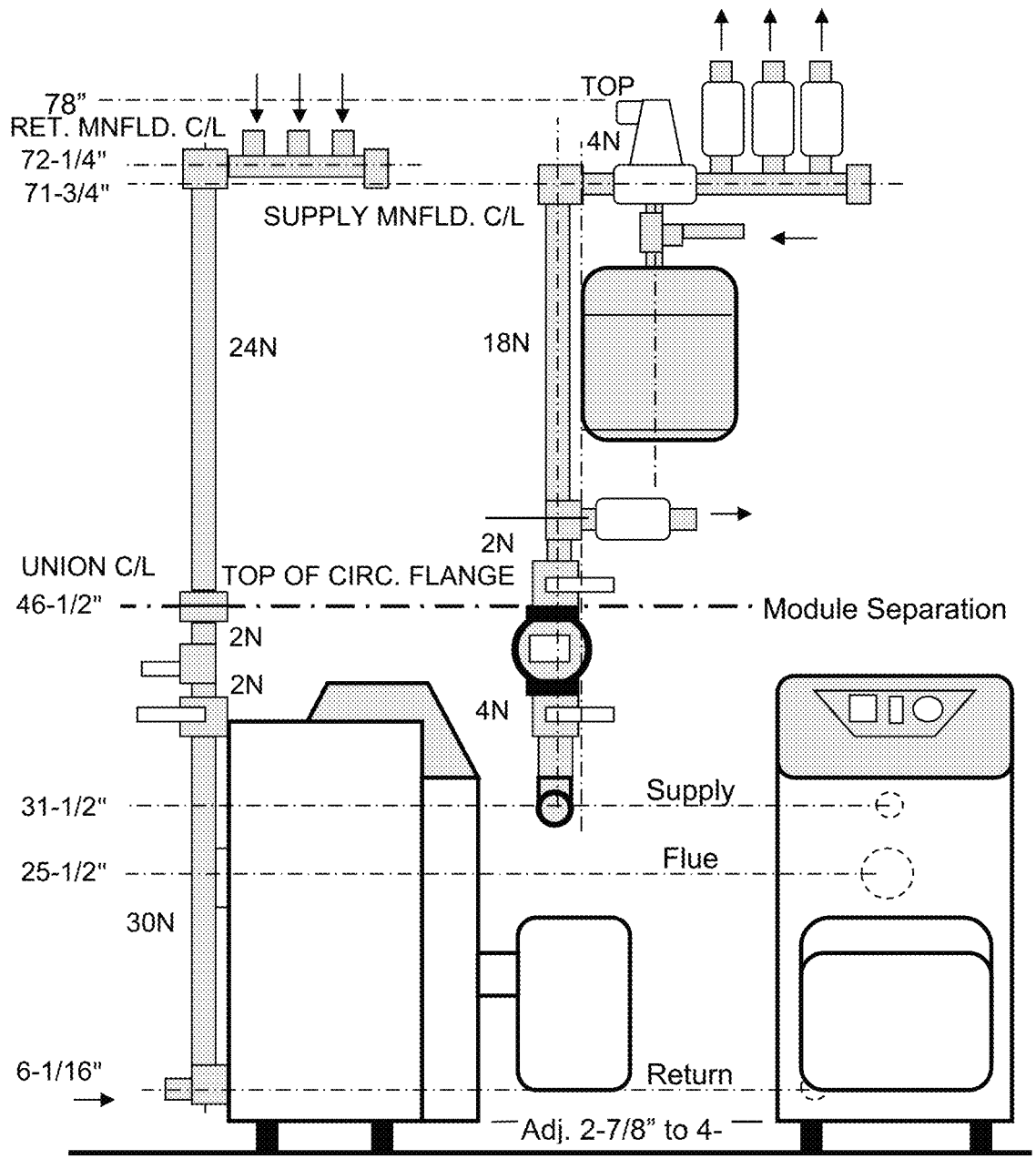
FIG. 15 depicts a scale drawing of compact appliance components with proportional dimensions configured in accordance with an embodiment of the invention.

FIG. 15 depicts a scale drawing of compact integrated free-standing hydronic heating appliance components with proportional dimensions 1500.

The foregoing description of the embodiments of the invention has been presented for the purposes of illustration and description. It is not intended to be exhaustive or to limit the invention to the precise form disclosed. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. An enhanced convection, differential temperature (Delta-T) managed, integrated free-standing hydronic heating appliance device consisting of:
a three-pass, high-mass, cast-iron boiler with capacity increments heat source comprising an output directly coupled to:
a single vertical supply riser comprising a lower portion and an upper portion;
said heat source output being directly coupled to a lower end of said lower portion of said single vertical supply riser;
an upper end of said lower portion of said single vertical supply riser coupled to a lower circulator isolation valve;
said lower circulator isolation valve coupled to:
an input of a single, variable speed, stand-alone high pass volute Electronically Commutated Motor (ECM) Delta-T system circulator having no check-valve;
an upper circulator isolation valve coupled to an output of said single, variable speed, stand-alone high pass delta-t system circulator;
a lower end of said upper portion of said single vertical supply riser coupled to said upper circulator isolation valve;
an upper end of said upper portion of said single vertical supply riser coupled to:
a compact steel hydronic supply header feeding at least one electronically controlled full port ball zone valve governing flow to at least one hydronic zone;
wherein said compact steel hydronic supply header comprises:
zone valve close grouping on said header, enhancing status lamp visibility, each said zone valve wired directly to a corresponding zone thermostat thereby negating use of a zone valve control (ZVC);
said supply header comprising an air eliminator before said zone valves;
a water service tee between said air eliminator and an expansion tank;
wherein a supply manifold centerline to a centerline of said high mass heat source output vertical distance is about 40 inches; and
a top of a circulator flange to said supply manifold centerline vertical distance is about 25 inches;
whereby near-boiler piping packaging to zone valving provides hydronic distribution efficiency, including convective fail-safe operation;
said high-mass heat source further comprising an input directly coupled to a single vertical return riser;
said single vertical return riser comprising a lower portion and an upper portion;
said heat source output being directly coupled to a lower end of said lower portion of said single vertical return riser;
an upper end of said lower portion of said single vertical return riser being coupled to a boiler isolator full port ball valve;
said boiler isolator full port ball valve being coupled to a purge valve;
said purge valve coupled to a pipe union;
said pipe union coupled to a lower end of said upper portion of said single vertical return riser;
a compact hydronic return header receiving a return flow from said at least one hydronic zone;
said compact hydronic return header coupled to an upper end of said upper portion of said single vertical return riser;
said compact hydronic return header comprising one full ball valve per zone;
wherein a return manifold centerline to a centerline of said high mass heat source input vertical distance is about 66 inches;
wherein said device includes no internal flow check valves;
wherein components are integrated into simplified, compact, assemblies;
whereby head pressure is reduced and flow increased and
whereby said high-mass Delta-T combination lowers system operating temperature, further reducing "stand-by" losses and increasing thermal efficiency.

2. The device of claim 1 comprising:
a tap comprising a valve above and proximate to said circulator on said single vertical supply riser;
said tap supplying an Indirect Water Heater (IWH) comprising an internal hydronic heating coil whereby Domestic Hot Water (DHW) is generated;
whereby a hydronic short-circuit priority is provided for said DHW; and
thermal mass of a reservoir of said DHW provides hydronic heat through said internal hydronic heating coil during power failure.

3. The device of claim 1 wherein dimensions comprise:
said return manifold centerline to a centerline of said high mass heat source input vertical distance of 66 inches;
said supply manifold centerline to a centerline of said high mass heat source output vertical distance of 40 inches;
said top of a circulator flange to said supply manifold centerline vertical distance of 25 inches;
whereby said high-mass Delta-T combination lowers system operating temperature, further reducing "stand-by" losses and increasing thermal efficiency.

4. The device of claim 1 comprising:
malleable fittings.

5. The device of claim 1, wherein said compact supply header comprises:
2¾ inch center-to-center stub spacing for compact placement of zone valves.

6. The device of claim 1, wherein at least one of said compact steel hydronic supply header and said compact hydronic return header comprising:
a compact schedule 40 steel hydronic header comprising 2, 3, 4, or 5 ports, each said port having 2.75 inch center-to-center stub spacing and a diameter of 0.75 inch and a length of 2 inches.

7. The device of claim 1 wherein at least one of said compact steel hydronic supply header and said compact hydronic return header comprising:
a field manifold comprising:
1.25 inch diameter and 0.75 inch diameter pipe, said 1.25 inch diameter pipe comprising a steel cap welded to one end of said 1.25 inch pipe;
a length of said 1.25 inch diameter pipe is 8 inches, 9 inches, 10 inches, 11 inches, or 12 inches;
taps are 0.75 inch×2 inches×2 inches on 2.5 or 2.75 inch centerlines for flow considerations.

8. The device of claim 1 comprising an aquastat.

9. An enhanced convection, differential temperature (Delta-T) managed, integrated free-standing hydronic heating system consisting of:
a three-pass, high-mass, cast-iron boiler with capacity increments heat source comprising an output directly coupled to:
a single vertical supply riser comprising a lower portion and an upper portion;
said heat source output being directly coupled to a lower end of said lower portion of said single vertical supply riser;
an upper end of said lower portion of said single vertical supply riser coupled to a lower circulator isolation valve;
said lower circulator isolation valve coupled to:
an input of a single, variable speed, stand-alone high pass volute Electronically Commutated Motor (ECM) Delta-T system circulator having no check-valve;
an upper circulator isolation valve coupled to an output of said single, variable speed, stand-alone high pass delta-t system circulator;
a lower end of said upper portion of said single vertical supply riser coupled to said upper circulator isolation valve;
an upper end of said upper portion of said single vertical supply riser coupled to:
a compact steel hydronic supply header feeding at least one electronically controlled full port ball zone valve governing flow to at least one hydronic zone:
wherein said compact steel hydronic supply header comprises:
zone valve close grouping on said header, enhancing status lamp visibility, each said zone valve wired directly to a corresponding zone thermostat thereby negating use of a zone valve control (ZVC);
said supply header comprising an air eliminator before said zone valves;
a water service tee between said air eliminator and an expansion tank;
wherein a supply manifold centerline to a centerline of said high mass heat source output vertical distance is about 40 inches; and
a top of a circulator flange to said supply manifold centerline vertical distance is about 25 inches;
whereby near-boiler piping packaging to zone valving provides hydronic distribution efficiency, including convective fail-safe operation;
said high-mass heat source further comprising an input directly coupled to a single vertical return riser;
said single vertical return riser comprising a lower portion and an upper portion;
said heat source output being directly coupled to a lower end of said lower portion of said single vertical return riser;
an upper end of said lower portion of said single vertical return riser being coupled to a boiler isolator full port ball valve;
said boiler isolator full port ball valve being coupled to a purge valve;
said purge valve coupled to a pipe union;
said pipe union coupled to a lower end of said upper portion of said single vertical return riser;
a compact hydronic return header receiving a return flow from said at least one hydronic zone;
said compact hydronic return header coupled to an upper end of said upper portion of said single vertical return riser;
said compact hydronic return header comprising one full ball valve per zone:
wherein a return manifold centerline to a centerline of said high mass heat source input vertical distance is about 66 inches;
wherein said device includes no internal flow check valves;
wherein components are integrated into simplified, compact, assemblies;
whereby head pressure is reduced and flow increased and
whereby said high-mass Delta-T combination lowers system operating temperature, further reducing "stand-by" losses and increasing thermal efficiency;
a control device configured for:
ramping up s aid circulator upon a zone demand;
decelerating s aid circulator on a return temperature increase;
providing low speed circulation optimized radiation convective heating;
operating convectively during a power loss via thermal mass; and
inhibiting hydronic heating convection during off demand cycles.

10. The enhanced convection, differential temperature (Delta-T) managed, hydronic heating system of claim 9, wherein dimensions comprise:
said return manifold centerline to a centerline of said high mass heat source input vertical distance of 66 inches;
said supply manifold centerline to a centerline of said high mass heat source output vertical distance of 40 inches;

said top of a circulator flange to said supply manifold centerline vertical distance of 25 inches;

whereby said high-mass Delta-T combination lowers system operating temperature, further reducing "stand-by" losses and increasing thermal efficiency.

11. The enhanced convection, differential temperature (Delta-T) managed, hydronic heating system of claim 9, wherein said compact supply header comprises:
2¾ inch center-to-center stub spacing for compact placement of zone valves.

12. The enhanced convection, differential temperature (Delta-T) managed, hydronic heating system of claim 9 comprising an aquastat.

13. The enhanced convection, differential temperature (Delta-T) managed, hydronic heating system of claim 9, wherein said single vertical supply riser module comprises:
a tap comprising a valve above and proximate to said circulator on said single vertical supply riser;
said tap supplying an Indirect Water Heater (IWH) comprising an internal hydronic heating coil whereby Domestic Hot Water (DHW) is generated;
whereby a hydronic short-circuit priority is provided for said DHW; and
thermal mass of a reservoir of said DHW provides hydronic heat through said internal hydronic heating coil during power failure.

14. An enhanced convection, differential temperature (Delta-T) managed, integrated free-standing hydronic heating method comprising:
providing an integrated free-standing closed-circuit hydronic heating appliance, said appliance consisting of:
a three-pass, high-mass, cast-iron boiler with capacity increments heat source comprising an output directly coupled to:
a single vertical supply riser comprising a lower portion and an upper portion;
said heat source output being directly coupled to a lower end of said lower portion of said single vertical supply riser;
an upper end of said lower portion of said single vertical supply riser coupled to a lower circulator isolation valve;
said lower circulator isolation valve coupled to:
an input of a single, variable speed, stand-alone high pass volute Electronically Commutated Motor (ECM) Delta-T system circulator having no check-valve;
an upper circulator isolation valve coupled to an output of said single, variable speed, stand-alone high pass delta-t system circulator;
a lower end of said upper portion of said single vertical supply riser coupled to said upper circulator isolation valve;
an upper end of said upper portion of said single vertical supply riser coupled to:
a compact steel hydronic supply header feeding at least one electronically controlled full port ball zone valve governing flow to at least one hydronic zone:
wherein said compact steel hydronic supply header comprises:

zone valve close grouping on said header, enhancing status lamp visibility, each said zone valve wired directly to a corresponding zone thermostat thereby negating use of a zone valve control (ZVC);
said supply header comprising an air eliminator before said zone valves;
a water service tee between said air eliminator and an expansion tank;
wherein a supply manifold centerline to a centerline of said high mass heat source output vertical distance is about 40 inches; and
a top of a circulator flange to said supply manifold centerline vertical distance is about 25 inches;
whereby near-boiler piping packaging to zone valving provides hydronic distribution efficiency, including convective fail-safe operation;
said high-mass heat source further comprising an input directly coupled to a single vertical return riser;
said single vertical return riser comprising a lower portion and an upper portion;
said heat source output being directly coupled to a lower end of said lower portion of said single vertical return riser;
an upper end of said lower portion of said single vertical return riser being coupled to a boiler isolator full port ball valve;
said boiler isolator full port ball valve being coupled to a purge valve;
said purge valve coupled to a pipe union;
said pipe union coupled to a lower end of said upper portion of said single vertical return riser;
a compact hydronic return header receiving a return flow from said at least one hydronic zone;
said compact hydronic return header coupled to an upper end of said upper portion of said single vertical return riser;
said compact hydronic return header comprising one full ball valve per zone;
wherein a return manifold centerline to a centerline of said high mass heat source input vertical distance is about 66 inches;
wherein said device includes no internal flow check valves;
wherein components are integrated into simplified, compact, assemblies;
whereby head pressure is reduced and flow increased and
whereby said high-mass Delta-T combination lowers system operating temperature, further reducing "stand-by" losses and increasing thermal efficiency;
ramping up said circulator upon a zone demand;
decelerating said circulator on a return temperature increase;
providing low speed circulation optimized radiation convective heating;
operating convectively during a power loss via thermal mass; and
inhibiting hydronic heating convection during off demand cycles.

* * * * *